(12) United States Patent
Jones

(10) Patent No.: US 11,643,161 B2
(45) Date of Patent: May 9, 2023

(54) MOBILITY AND EXERCISE VEHICLE

(71) Applicant: Micheal Don Jones, Portland, OR (US)

(72) Inventor: Micheal Don Jones, Portland, OR (US)

(*) Notice: Subject to any disclaimer, the term of this patent is extended or adjusted under 35 U.S.C. 154(b) by 0 days.

(21) Appl. No.: 17/889,021

(22) Filed: Aug. 16, 2022

(65) Prior Publication Data
US 2022/0388593 A1 Dec. 8, 2022

Related U.S. Application Data

(63) Continuation of application No. 16/840,724, filed on Apr. 6, 2020, now Pat. No. 11,447,204.

(60) Provisional application No. 62/830,454, filed on Apr. 7, 2019.

(51) Int. Cl.
| | |
|---|---|
| *B62K 5/025* | (2013.01) |
| *B62M 6/45* | (2010.01) |
| *B62M 9/02* | (2006.01) |
| *B62M 1/28* | (2013.01) |
| *B62M 6/60* | (2010.01) |
| *B62K 21/18* | (2006.01) |
| *B62M 1/16* | (2006.01) |

(52) U.S. Cl.
CPC .............. *B62K 5/025* (2013.01); *B62K 21/18* (2013.01); *B62M 1/16* (2013.01); *B62M 1/28* (2013.01); *B62M 6/45* (2013.01); *B62M 6/60* (2013.01); *B62M 9/02* (2013.01)

(58) Field of Classification Search
CPC . B62M 9/02; B62M 1/16; B62M 1/28; B62M 6/45; B62M 6/60; B62K 5/025
See application file for complete search history.

(56) References Cited

U.S. PATENT DOCUMENTS

| | | | | |
|---|---|---|---|---|
| 1,503,832 | A * | 8/1924 | Hubbard | B62M 1/14 280/248 |
| 3,760,905 | A * | 9/1973 | Dower | F03G 5/00 185/40 H |
| 4,508,358 | A * | 4/1985 | Erel | B62M 1/12 482/66 |
| 4,928,986 | A * | 5/1990 | Carpenter | B62M 1/12 280/240 |
| 5,280,936 | A * | 1/1994 | Schmidlin | B62M 1/12 280/252 |
| 5,690,346 | A * | 11/1997 | Keskitalo | B62M 1/24 482/57 |
| 5,833,256 | A * | 11/1998 | Gilmore | B62K 3/005 280/224 |

(Continued)

*Primary Examiner* — Amy R Weisberg
*Assistant Examiner* — Hosam Shabara
(74) *Attorney, Agent, or Firm* — Craig R. Rogers; Simple IP Law, PC

(57) ABSTRACT

A pump-action mobility and exercise device may include a pumping arm attached to a foot slide. As the pumping arm is actuated, the foot slide moves forward and rearward in response to the pumping action. The foot slide can also be moved by a user's foot movement. The foot slide may be connected to a drive mechanism that selectively engages a chain or belt that loops around a drive wheel arranged on an axle of the vehicle. When the drive mechanism catches and moves the belt or chain in a forward direction, the axle rotates in a forward direction to drive the vehicle forward. A reverse mechanism may also be provided that selectively causes the drive mechanism to catch and drive the belt or chain in an opposite direction.

20 Claims, 5 Drawing Sheets

(56) References Cited

U.S. PATENT DOCUMENTS

| | | | | |
|---|---|---|---|---|
| 8,851,215 B2* | 10/2014 | Goto | ................ | B62M 6/55 |
| | | | | 180/19.1 |
| 9,994,283 B1* | 6/2018 | Bleifuss | ................ | B62K 5/06 |
| 10,479,439 B2* | 11/2019 | Jones | ................ | B62M 9/16 |
| 10,752,317 B1* | 8/2020 | Jones | ................ | B62M 1/18 |
| 10,858,065 B1* | 12/2020 | Kipnis | ................ | B62K 3/005 |
| 2008/0129008 A1* | 6/2008 | Tarasov | ................ | B62M 1/12 |
| | | | | 280/220 |

* cited by examiner

MOBILITY AND EXERCISE VEHICLE

PRIORITY CLAIM

This application is a continuation of, and claims priority from U.S. patent application Ser. No. 16/840,724, filed Apr. 6, 2020, now U.S. Pat. No. 11,447,204, which is a non-provisional of, and claims priority from, U.S. Provisional Patent Application Ser. No. 62/830,454, filed Apr. 7, 2019, the contents of each of which are incorporated herein by reference in their entirety.

BACKGROUND OF THE INVENTION

Field of the Invention

This invention relates generally to mobility vehicles. More particularly, this invention relates primarily to mobility vehicles such as wheelchairs and the like that are specially designed to provide increased mobility and therapy for handicapped individuals.

Related Art

Applicant is the inventor of U.S. Pat. Nos. 5,829,772; 6,179,314; 6,932,370; and 10,479,439, the contents of each of which are incorporated herein by reference in their entireties. Pump-Action vehicles have been used as children's toys and as therapy devices for children with disabilities, including learning or developmental disorders. They have also been proposed as transportation devices for adults.

Conventional wheelchairs can be bulky and difficult to operate. In particular, manually-operated wheelchairs include large driving wheels that can be cumbersome and difficult for many people to operate. They can also be difficult to position in relationship to furniture such as dining tables or other tables. Powered wheelchairs provide no exercise for the operator. Furthermore, conventional wheelchairs provide no mechanism for exercising a person's legs while operating.

What would be desirable is a mobility device that permits movement based on simple arm motions and provides enhanced convenience, comfort, accessibility, and movement to users of the mobility device, including handicapped persons.

SUMMARY OF THE INVENTION

According to various embodiments and principles of the present inventive concepts, a mobility vehicle can be provided having numerous improvements over the related art, including, for instance, a small footprint and tight turn radius, along with an improved driving system and increased therapeutic benefits. The mobility vehicle can also be easily transportable.

In particular, principles of the present inventive concepts provide a mobility vehicle that can be driven using simple arm motions such as a pumping or rowing action. This can provide a mobility assistance and exercise device for elderly, handicapped, or other mobility-restricted individuals. A pumper arm may be provided, for instance, which propels the vehicle through a simple pumping action. Alternatively, rowing arms may be provided which propel the vehicle based on a simple rowing action. A motor can also be provided to assist in providing movement.

A mobility vehicle according to principles of the present inventive concepts can further include one or more foot slides (or step plates) that engage the feet of the operator and slide forward and backward during operation of the pumper or rowing arms. The foot slide(s) may be mounted to a frame of the vehicle through sliding rails or other mechanisms that permit the slides to move forward and backward along the frame during operation of the vehicle. One or more sliding rails could be provided for the foot slide. Stops or limiters could be provided on the frame to limit the forward and rearward movement of the foot slide(s) along the rails.

In one embodiment, a foot slide is attached to the frame on two slide rails that permit the foot slide to slide smoothly forward and rearward. Stops are provided on the frame to limit the forward and rearward movement of the foot slide. The foot slide is preferably connected to a bottom end of the pumper arm. As the pumper arm is actuated, the foot slide moves forward and backward along the rails in opposition to the movement of the handle bar. More particularly, as the handle bar is pulled rearward (or backward toward the operator), the foot slide moves forward. As the handle bar is pushed forward, the foot slide moves rearward.

The foot slide can have one or more guards that help keep an operator's feet in position within the foot slide during operation. The guards could, for instance, be raised edges of the slide itself or other attached ridges or structures that keep the operator's feet from sliding out of the foot slide. The foot slide could include two, separate foot slides, one for each foot. Using the foot slide(s) connected to the pumper or rower arms, the operator's feet can move forward and rearward during operation of the vehicle and provide therapeutic exercise to the operator's legs.

When possible, the operator could also move the foot slide(s) themselves using their leg muscles to assist in the pumping action. The foot slide(s) can include a tread pattern and/or friction surface that helps maintain traction between the operator's feet and the foot slide. For instance, a tread pattern can be formed directly on the foot slide, or a rubberized or other gripping surface can be provided on top of the foot slide.

In an embodiment having two rower arms rather than a single pumper arm, two foot slides could be provided, each connected to an individual one of the rower arms. The foot slides in this embodiment move forward and rearward in opposition to the movement of the corresponding rower arm.

The pumper or rower arms may further connect to a steering mechanism of the vehicle through a universal joint located at the pivot point of the arms. The front wheel or wheels are preferably arranged on pivot pins that permit them to swivel right or left. A steering bar or steering bars are connected to the wheel(s) to cause them to pivot left or right on their pivot pins. A steering arm is preferably connected to the steering bar(s). The steering arm is connected to the pumper or rower arms through the universal joint. When the pumper or rowing arms are turned, the steering arm rotates in response and pivots the connected wheel(s) to turn the vehicle.

The pumper arm, for instance, may include a handle bar connected to a steering arm that extends downward between bracket-like structures arranged on opposite sides of the steering arm. A bottom end of the pumper arm is preferably connected to the foot slide.

In one embodiment, a mobility vehicle permits an operator to operate the vehicle using their arms and/or legs. Additionally, or alternatively, a battery-powered motor may provide all, a portion, or none of the driving force needed to operate the vehicle. A pumper arm assembly propels the mobility vehicle through a simple pumping action. A foot slide (or step plate) may engage the feet of the operator and slide forward and backward during operation of the pumper arm assembly. The foot slide may be mounted to a frame of the vehicle on sliding rails that permit the foot slide to slide forward and backward along the frame. Stops (or limiters) may be provided to limit the forward and/or rearward movement of the foot slide(s). A step plate support or reinforcement may also be provided which adds additional stability to the foot slide.

The foot slide may be connected to a bottom end of the pumper arm assembly through transfer arms and transfer linkages. The transfer linkages may be adjustable in length to finely tune the relationship between the pumper arm assembly and the foot slide. As the pumper arm is actuated, the foot slide moves forward and backward along the rails in opposition to the movement of the pumper arm handle bar. More particularly, as the handle bar moves backward, the foot slide moves forward. As the handle bar moves forward, the foot slide moves rearward.

The foot slide (step plate) can have one or more guards (not shown) that help keep an operator's feet in position within the foot slide during operation. The guards could, for instance, be raised edges of the slide itself or other attached ridges or structures that keep the operator's feet from sliding out of the foot slide. Using the foot slide connected to the pumper arm assembly, the operator's feet can move forward and rearward during operation of the vehicle and provide therapeutic exercise to the operator's legs even when they are not used to help provide the driving force.

The operator could, however, use their leg muscles to move the foot slide themselves to assist in the pumping action. The foot slide can include a tread pattern and/or friction surface (not shown) that helps maintain traction between the operator's feet and the foot slide. For instance, a tread pattern can be formed directly on the foot slide, or a rubberized or other gripping surface can be provided on top of the foot slide.

A steering assembly can be provided in which the pumper arm handle bar connects to a steering mechanism of the vehicle through a universal joint located at the pivot point of the pumper arm. The pumper arm assembly, for instance, may include a handle bar connected to a steering arm, with a bracket-like structured pumper arm that extends downward along opposite sides of the steering arm. A bottom end of the pumper arm is preferably connected to the foot slide through the transfer arms and transfer linkages. A hinge mechanism preferably connects the pumper arm to a pumper arm base that is, in turn, connected to the frame.

The front wheel is preferably mounted to the steering mechanism (in this embodiment, a steering fork), and the steering mechanism is arranged in such a way that it can swivel right and left with the front wheel. The steering arm may be connected to the steering mechanism through a steering bar. The steering arm may be connected directly to the handle bar or rower arms and then connected to the steering bar through the universal joint. When the handle bar is turned, the steering arm and steering bar rotate in response and pivot the steering mechanism, connected to the front wheel, to turn the vehicle. Bearings and bearing supports may be provided to align the steering arm and steering bar within the pumper arm and pumper arm base.

A battery powered motor and associated battery may be provided to assist in providing a driving force to the vehicle. The motor may be connected to the driving axle through a belt, chain, or other connection mechanism. In one embodiment, the operator is given the option of selecting how much assistance to receive from the motor. The selection may range anywhere from no assistance to maximum assistance. A sensor may also be provided that detects when the operator is having difficulty powering the vehicle and activates the motor assist in response.

In this embodiment, the driving mechanism may include a driving belt that travels in a loop around two wheels. A first, free spinning wheel is arranged toward the front of the vehicle. A second, drive wheel is fixidly attached to the driving axle, to force rotation of the driving axle in the direction of the rotation of the drive wheel. The belt and wheels could, of course, be readily replaced with a chain and sprockets.

A driving mechanism may be arranged over the belt and move forward and backward along with the foot slide in response to motion of the pumper arm. The driving mechanism may include a base, a bracket, and a driving catch that is pivotably mounted in the bracket. The driving catch may be biased by a spring into a forward driving position, or it may be activated into a forward driving position by a squeeze lever or other mechanism on the handle, or any other mechanical or electrically-assisted activation device.

In the forward driving position, a first engaging end of the driving catch engages with teeth in the belt. The first engaging end of the catch is designed such that it engages with the teeth of the belt when moving in a first (forward) direction, but slides past the teeth without engagement when moving in a second, opposite direction. In this manner, as the driving mechanism moves forward with the foot slide, the first engaging end of the catch engages with the teeth of the belt to drive the belt forward. As it does so, the drive wheel is driven forward, driving the axle (along with the connected rear wheels) in a forward direction as well. Thus, the mobility vehicle is driven forward in response to pumper arm assembly movement.

A reverse mechanism can also be provided that enables operation in a reverse direction. The reverse mechanism may operate by pivoting the driving member into a reverse position against the force provided by the spring. This can be accomplished, for example, using a squeeze handle arranged on the handle bar, or through the use of some other lever or switch that may be connected to the driving mechanism through cabling, for example. When the reverse mechanism is actuated, the driving member is pivoted such that an opposite, second engaging end of the driving member engages the belt. The second engaging end of the driving member is configured to engage teeth of the belt when moving in a rearward direction, but slide freely without engaging the belt when moving in a forward direction. In this manner, with the reverse mechanism engaged, the driving mechanism engages and drives the belt in a rearward direction, causing the rear drive wheel, axle, and rear wheels to move in a reverse direction. The vehicle is thus driven rearward in response to movement of the pumper arm and foot slide. The reverse mechanism can also be configured to cause the motor to drive the vehicle in the reverse direction.

In an alternative embodiment, two driving mechanisms can be provided to drive the belt or chain. This embodiment may be useful, for example, when rowing arms are used rather than a pumper arm.

In another embodiment, the driving mechanism may include a driving chain that travels in a loop around two sprockets. A first, free spinning sprocket is arranged near the front of the vehicle. A second, driving sprocket is fixidly attached to the driving axle, to force rotation of the driving axle in the direction of the rotation of the driving sprocket.

A forward driving catch may be arranged over the chain and move forward and backward along with the foot slide in response to motion of the pumper arm. The forward driving catch closes over the chain and catches and pulls on the top segment of the chain as it moves forward with the foot slide. As the top of the chain is driven forward, the rearward driving sprocket is also driven forward along with the axle and attached wheels. Thus, the mobility vehicle is driven forward in response to pumper arm movement. The forward driving catch may be configured to catch by default, or it may be activated by a squeeze lever or other mechanism on the handle, or any other mechanical or electrically-assisted activation device. In an embodiment with an activation mechanism, the forward driving catch may close over and catch the chain only when activated and the driving mechanism may be in a neutral position by default.

The forward driving catch may provide a ratchet-like action that catches and drives the chain forward during forward movement of the catch, but slides rearward freely without catching the chain. This can be accomplished, for instance, by providing engaging edges on the forward end of the catch that catch on the chain as the forward driving catch moves forward. The rearward end of the catch, however, can be open, or slanted away from the chain so that the forward driving catch slides freely rearward without engaging the chain.

A reverse mechanism can be provided in a similar manner. Specifically, a rearward driving catch can also be provided over a bottom segment of the chain and move forward and rearward along with the foot slide. The rearward driving catch may be activated by a squeeze handle or other activation device. When activated, the rearward driving catch closes over the chain and catches and pulls forward on the bottom of the chain as it moves forward with the foot slide as the pumper arm is pulled. As the bottom of the chain is pulled forward, the driving sprocket and driving axle are driven in reverse, causing rearward motion of the mobility vehicle. The forward driving catch should also be deactivated while the reverse driving catch is active. The reverse driving catch may have a ratchet-like construction similar to the forward driving catch such that it grabs and pulls the chain during forward movement, but slides freely along the chain during rearward movement.

In an alternative embodiment, the chain may be replaced by a belt or other driving system that circles around a free spinning front wheel or pulley and the rearward driving axle. The belt can be configured to provide the driving force to the axle, and the forward and rearward driving catches can be configured to pull the belt in a forward direction along the top or bottom of the belt, respectively, to drive the axle in the desired direction for forward or rearward movement of the vehicle.

In addition to the forward and rearward settings, a neutral setting may also be provided in which the foot slide and pumper arm do not engage the driving chain or belt. This setting may be provided to disable the pump-action power when a service provider desires to push or pull the vehicle without possible interference by the vehicle occupant, or when a vehicle occupant desires to coast without movement of the pumper arm or foot slide.

In another embodiment, the driving mechanism of the vehicle includes one or more sprockets arranged on an axle along with a drive wheel. The sprocket receives a chain connected to the pumper or rowing arms (such as through the foot slide) and rotates in response to the arm movement. Gears on the sprocket engage with a drive gear connected to the drive wheel to drive the drive wheel.

In a still further embodiment, two sprockets are provided on a driving assembly to selectively permit either forward or rearward movement of the vehicle based on pumper arm action. A first sprocket is connected to a forward driving gear, both of which are rotatably and slidably mounted on the axle on one side of the drive wheel. A second sprocket is connected to a rearward driving gear and both are rotatably and slidably mounted on the axle on an opposite side of the drive wheel from the first sprocket. The first and second sprockets drive their respective gears only in one direction (either forward or reverse, respectively) while spinning freely in the opposite direction.

A chain and spring assembly is provided for each of the sprockets. A first chain is arranged such that a first end of the first chain connects to the foot slide (or pumper arm). The first chain runs from the foot slide to a top of the first sprocket and then around the first sprocket. The second end of the first chain, coming from below the first sprocket, connects to one end of a first spring that is connected at its other end to the frame. As the pumper arm is actuated (pulled rearward), the foot slide moves forward, pulling the first chain along with it. As the first chain is pulled, it drives the first sprocket in a forward direction along with the connected forward driving gear and stretches the first spring. The first spring pulls the first chain back into its original position as the pumper arm moves forward again.

The second chain is arranged such that a first end of the second chain connects to one end of a spring that is connected at its other end to the frame. The chain extends from the spring to the top of the second sprocket and then around the sprocket. The second end of the second chain, coming from below the second sprocket, connects to the foot slide (or pumper arm). As the pumper arm is actuated, the second chain drives the second sprocket in a reverse direction along with its connected rearward driving gear. The second spring pulls the second chain back into its original position as the pumper arm moves forward again.

A chain retention system could be provided for one or both of the chains to reduce the length of spring needed to retract the chain to its original position. The chain retention system could include a pulley mounted on an end of a lever arm that is pivotably mounted to the frame. Rather than attach a spring to the end of the chain, a spring is attached to the lever arm such that the lever arm is biased in an extended position. The chain is connected to the frame at a first end near the chain retention system and extends around the pulley, to the sprocket, and then around the sprocket to the foot slide connection point. As the pump arm retracts and the foot slide moves forward, the chain pulls down on the pulley and lever arm and stretches the spring. When the pump arm moves forward, the spring pulls on the lever arm to raise it back into its extended position and return the chain to its starting position.

In this embodiment, a drive wheel hub may be rotatably mounted at a center location on the axle. A drive wheel gear may be rotatably arranged on the hub, and the drive wheel may be rigidly secured to the drive wheel gear to rotate along with the drive wheel gear. The drive wheel gear preferably includes teeth on both right and left side faces of the drive wheel gear.

The first and second sprockets may be connected to each other through the drive wheel hub using one or more pins or other mechanical connection that maintains them at a constant, predetermined distance from each other. The mechanical connection between the sprockets preferably maintains a constant distance between the first and second sprockets (with their associated gears) as they slide back and forth along the axle. One or more springs arranged on the axle preferably bias the sprockets in a position where the forward driving gear, connected to the first sprocket, engages a first side of the drive wheel gear arranged on the same side of the drive wheel as the first sprocket. With the forward driving gear engaged, the drive wheel is driven in a forward rotation as the pumper arm is operated, causing the vehicle to move forward.

A squeeze bar is preferably provided on one side of the pumper arm handle or one of the rowing-style handles. The squeeze bar may be connected to an actuator bar or shifting mechanism through a cable system. The actuator bar is preferably connected to the sprocket assembly. When the squeeze bar is squeezed, the cable tightens and activates the actuator arm or shifting mechanism to move the sprocket assembly. More particularly, in response to a squeeze of the squeeze bar, the actuator arm or shifting mechanism slides the sprocket assembly against the spring bias into a reverse position. The actuator arm may, for instance, be a curved rod or bar that communicates with the second sprocket.

The squeeze bar may, for instance, be configured such that a squeeze of ¾ inch or less is sufficient to move the sprocket assembly between its forward and reverse positions. As the sprocket assembly slides to the reverse position, the forward driving gear disengages from the drive wheel gear, and the rearward driving gear connected to the second sprocket engages with the drive wheel gear on the side opposite the forward driving gear. In this position, as the pumper arm is operated, the driving wheel is driven in a reverse direction, causing the vehicle to move backwards.

Of course, any other desired actuating mechanism (whether mechanical, electrical, or a combination of the two) such as a lever, button, dial, slide, or other device could be used to shift the sprockets from their forward-driving engagement to their rearward-driving engagement. Once the actuating or shifting mechanism is deactuated, the bias spring drives the first sprocket and forward driving gear back into engagement with the drive wheel gear and disengages the rearward driving gear so that operation of the pumper arm will drive the vehicle forward again. The teeth of the driving gears and drive wheel gear can be beveled or angled on their non-driving edges to permit self-alignment as the driving gears are moved into position.

A similar transmission system could also be employed on pedal and other vehicles to shift from forward to reverse. In an embodiment having two handles, such as a rowing-style design, an extra sprocket could be provided on each side of the drive wheel. The extra sprockets facilitate the opposing forward and backward movement of the two handles.

A braking system can also be provided. The braking system could include a braking bar that pushes against the drive wheel when the brake is actuated. The brake could be actuated using a squeeze lever arranged on a handle opposite to the reverse-actuating mechanism. The squeeze lever could be connected to the braking bar through a cabling system. When the brake squeeze lever is squeezed, the cable tightens and pulls the braking lever up against the drive wheel. The braking system could be lockable to lock the brake in place and keep the vehicle from moving. The brake locking system could, for instance, be a toggle type system in the squeeze lever or a separate latch that folds over the squeeze lever and locks it in place. Of course, the braking system could be actuated in any other desirable manner and include any other desired type of braking system. For instance, a hand lever connected to the frame could be used to actuate and release the brake.

The drive wheel may include an inflatable tire with a tread pattern mounted thereon and designed to engage a ground surface and provide sufficient traction to move the vehicle. The drive wheel may be arranged substantially directly underneath a seat of the vehicle (for instance, just rearward of a seat post) so that the operator's center of gravity is arranged substantially directly above the drive wheel.

The seat itself may be foldable, rotatable, lockable, and removable. More particularly, the seat back may fold down. The seat may swivel to permit easier operator entry and to facilitate positioning of the user next to a table. The seat may be lockable in a forward-facing position during operation of the vehicle and may be lockable in other desired positions as well. And the seat may be readily-removable by simply lifting it off of its seat post. The seat could also be lockably attached to the vehicle to prevent undesired removal.

In addition to the drive wheel with its inflatable tire, two additional wheels and tires may be provided on opposite ends of the rear axle to provide stability. In one embodiment, these stabilizing wheels are preferably free-spinning wheels having a hard rubber tire. Furthermore, the stabilizing tires may contain little or no tread. The tires on the driving wheel and stabilizing wheels preferably have approximately the same diameter to keep the vehicle from rocking from side to side during operation.

To further improve transportability of the vehicle, the entire front end of the vehicle (including for instance, the forward pumping and steering assembly) could be foldable to collapse against the frame of the vehicle. In one such embodiment, the front end assembly could be mounted to the rest of the frame through a hinged joint. A spring biased latch could be provided to mate within a bracket on the frame to securely hold the front end assembly in its operating position. To collapse the front end, the latch could be released using a release mechanism. The release mechanism could, for example, be a lever, button, dial, slide, or any other desired release mechanism.

In each of these embodiments, a small motor could be provided as an assistance mechanism to help propel the vehicle. In one embodiment, one or more sensors can be provided that sense resistance as an operator attempts to operate the pumper arms and propel the vehicle. If a large amount of resistance is detected (such as on an incline or for users with less arm mobility or strength), the sensors can detect this and engage the motor. The motor is preferably connected to the axle to help provide a driving force for the vehicle when needed. The motor may also be controllable to drive the axle in either a forward or reverse direction.

A user selectable switch or other user selectable control could be provided to enable the user to select how much assistance they would like from the motor. A user could, for example, choose to operate the vehicle completely manually, or the user could select up to a maximum amount of assistance from the motor. Preferably, the switch or other user selectable control permits a wide range of options between the minimum and maximum assistance.

Various aspects, embodiments, and configurations of the inventive concepts are possible without departing from the principles disclosed herein. The inventive concepts are therefore not limited to any of the particular aspects, embodiments, or configurations shown or described herein.

BRIEF DESCRIPTION OF DRAWINGS

The foregoing and additional objects, features, and advantages of the present inventive concepts will become more readily apparent from the following detailed description, made with reference to the attached figures, in which.

DETAILED DESCRIPTION OF ILLUSTRATIVE EMBODIMENTS

Various features, benefits, and configurations incorporating principles of the present inventive concepts in an illustrative embodiment are shown in the accompanying drawings. Additional features, benefits and configurations will be readily apparent to those of ordinary skill in the art based on this disclosure, and all such features, benefits and configurations are considered within the scope of the present invention. Various features will now be described in greater detail in connection with an embodiment of the present inventive concepts, as illustrated in the accompanying drawings.

Figure 1:
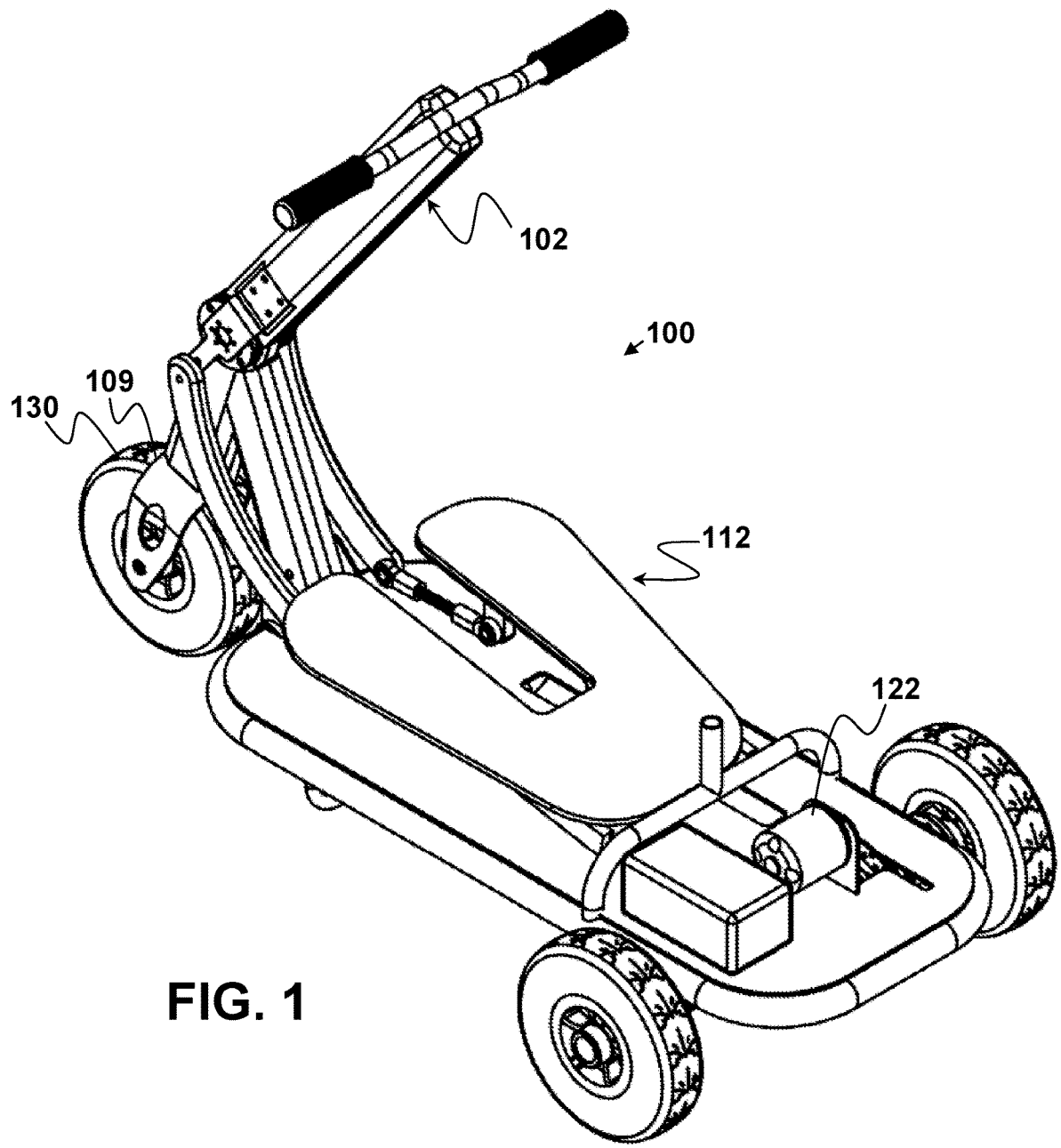
FIG. 1 is a somewhat schematic perspective view of a mobility vehicle according to principles of the present inventive concepts.
Figure 1A:
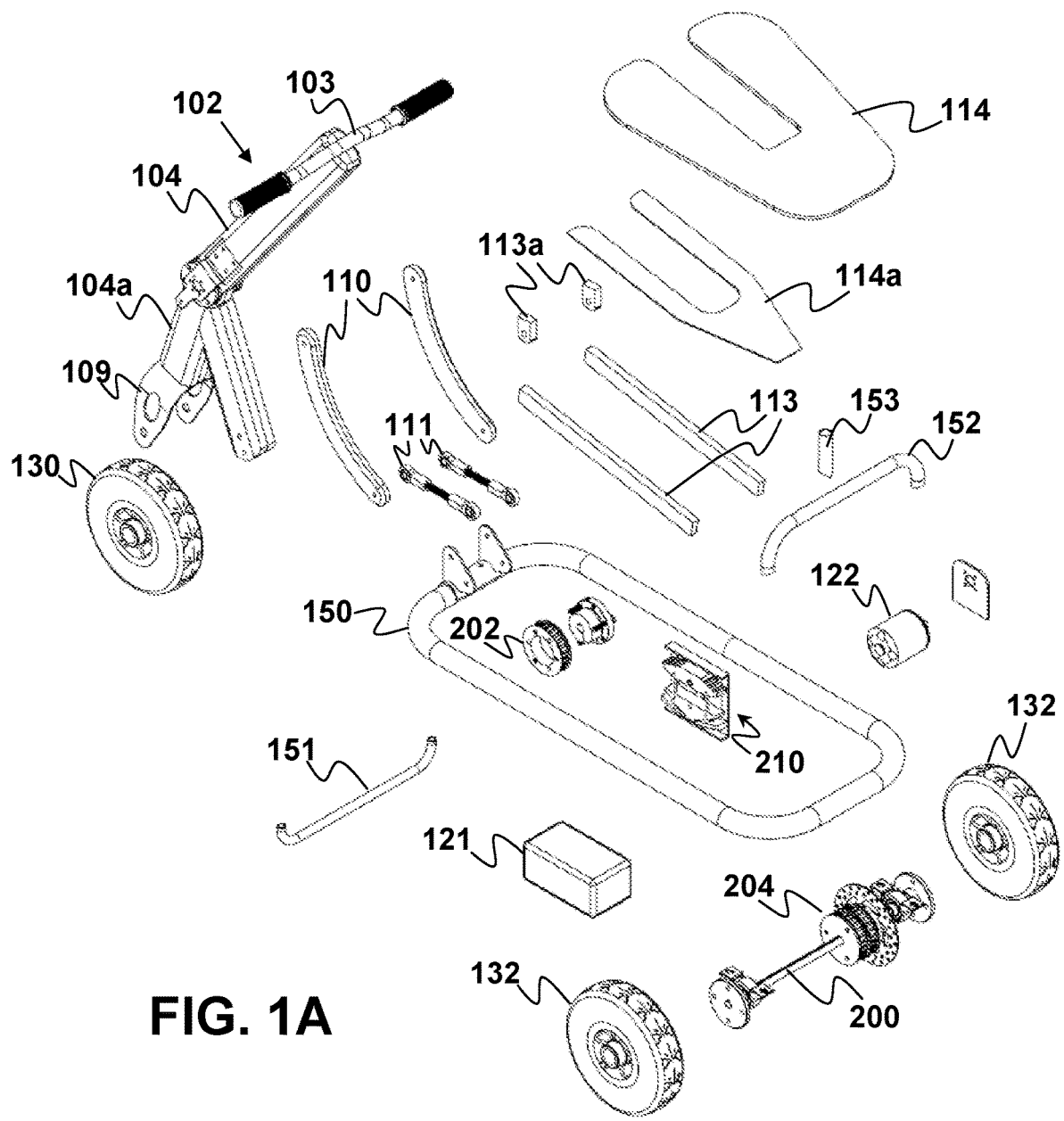
FIG. 1A is a somewhat schematic exploded perspective view of the mobility vehicle of FIG. 1.
Figure 2:
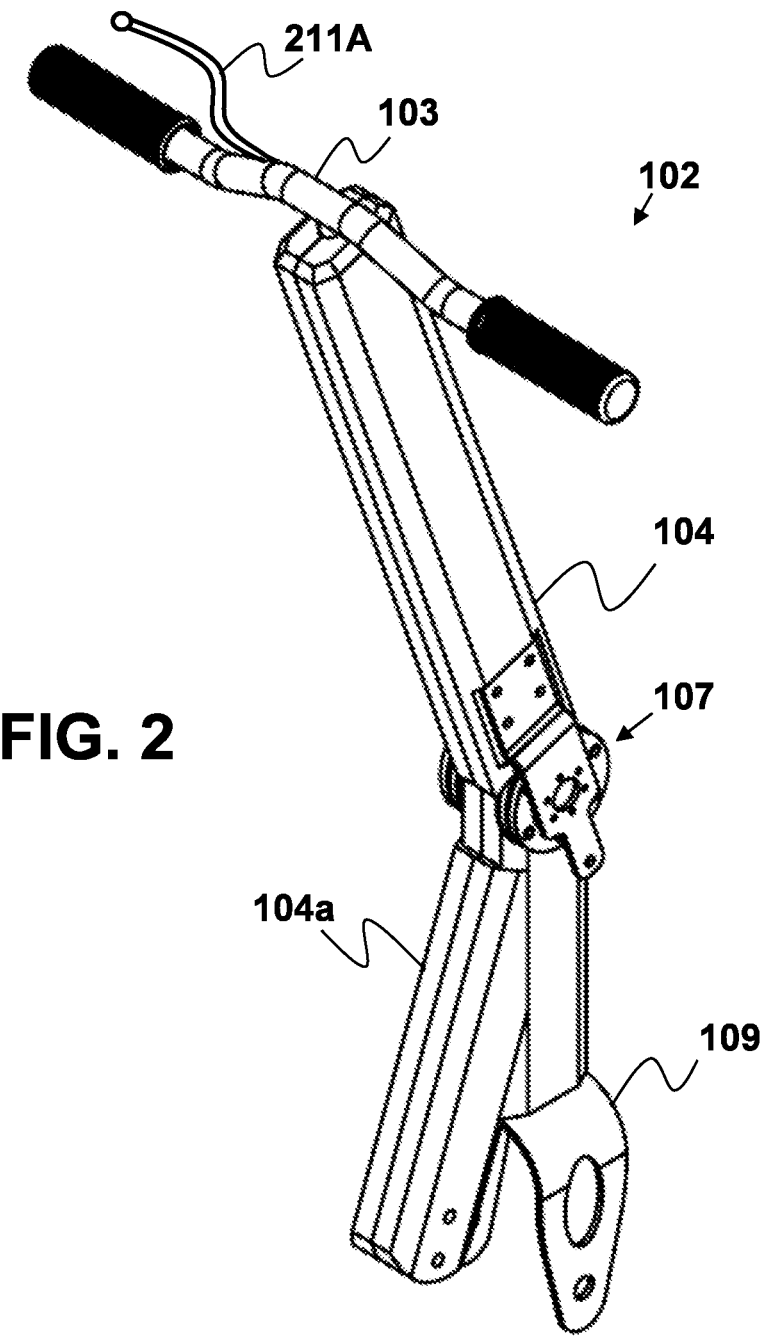
FIG. 2 is a somewhat schematic perspective view of a pumper arm of the mobility vehicle of FIG. 1, according to additional principles of the present inventive concepts.

Referring first to FIGS. 1 and 2, in one embodiment, a mobility vehicle 100 is provided which permits an operator to operate the vehicle 100 using their arms and/or legs. The vehicle 100 may additionally, or alternatively, provide leg and arm movement to the operator while operating using a battery-powered motor 122. The battery-powered motor 122 may provide all, a portion, or none of the driving force needed to operate the vehicle 100. In other words, the motor 122 may selectively provide the driving force for the vehicle 100, assist in providing the driving force for the vehicle 100, or be disabled from providing any assistance, dependent upon the needs or desires of the operator.

A pumper arm assembly 102 may be provided which propels the mobility vehicle 100 through a simple pumping action. A foot slide (or step plate) assembly 112 may also be provided which engages the feet of the operator and slides forward and backward during operation of the pumper arm assembly 102.

More specifically, the foot slide assembly 112 may include one or more foot slides 114 mounted to a frame 150 of the vehicle 100 through slides 113a arranged on sliding rails 113. The foot slide 114 may thereby be enabled to move forward and backward along the frame 150 during operation of the vehicle 100. Stops or limiters (not shown) may be provided on the frame 150 or rails 113 to limit the forward and/or rearward movement of the foot slide 114 along the rails 113. A step plate support or reinforcement 114a may also be provided which adds additional stability to the foot slide 114.

The foot slide 114 may be connected to a bottom end of the pumper arm assembly 102 through transfer arms 110 and transfer linkages 111. The transfer linkages 111 may be adjustable in length to finely tune the relationship between the pumper arm assembly 102 and the foot slide assembly 112. As the pumper arm 104 is actuated, the foot slide 114 moves forward and backward along the rails 113 in opposition to the movement of the pumper arm handle bar 103. More particularly, as the handle bar 103 moves backward, the foot slide 114 moves forward. As the handle bar 103 moves forward, the foot slide 114 moves rearward.

The foot slide (step plate) 114 can have one or more guards (not shown) that help keep an operator's feet in position within the foot slide 114 during operation. The guards could, for instance, be raised edges of the slide 114 itself or other attached ridges or structures that keep the operator's feet from sliding out of the foot slide 114. Using the foot slide 114 connected to the pumper arm assembly 102, the operator's feet can move forward and rearward during operation of the vehicle 100 and provide therapeutic exercise to the operator's legs even when they are not used to help provide the driving force.

The operator could, however, use their leg muscles to move the foot slide 114 themselves to assist in the pumping action. The foot slide 114 can include a tread pattern and/or friction surface (not shown) that helps maintain traction between the operator's feet and the foot slide 114. For instance, a tread pattern can be formed directly on the foot slide 114, or a rubberized or other gripping surface can be provided on top of the foot slide 114.

Figure 2A:
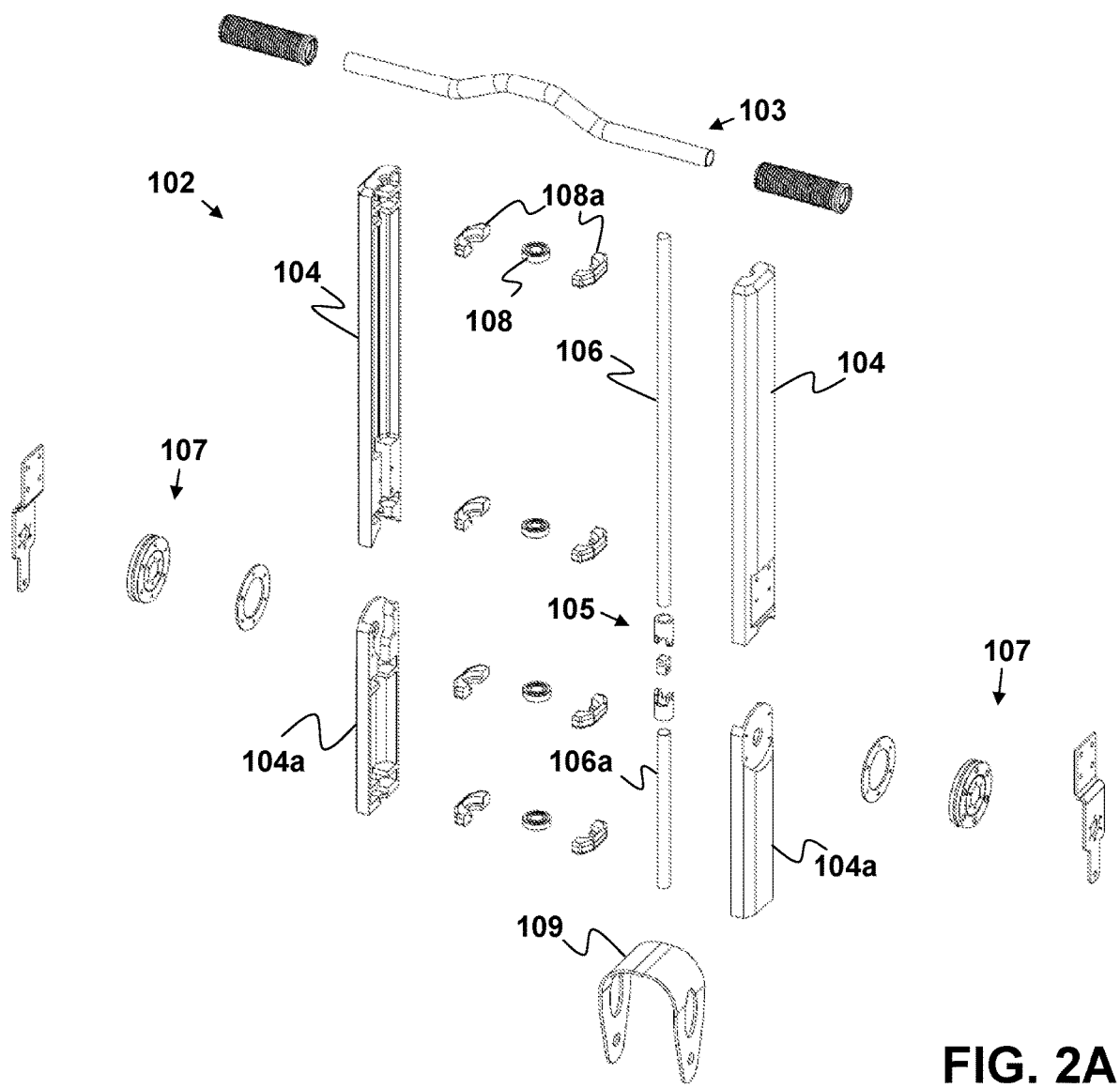
FIG. 2A is a somewhat schematic exploded perspective view of the pumper arm of FIG. 2.

Referring now additionally to FIGS. 2 and 2A, the pumper arm assembly 102 may include a pumper arm handle bar 103 that connects to a steering mechanism 109 of the vehicle 100 through a universal joint 105 located at the pivot point of the pumper arm 104. The pumper arm assembly 102, for instance, may include a handle bar 103 connected to a steering arm 106, with a bracket-like structured pumper arm 104 that extends downward along opposite sides of the steering arm 106. A bottom end of the pumper arm 104 is preferably connected to the foot slide 114 through transfer arms 110 and transfer linkages 111. A hinge mechanism 107 connects the pumper arm 104 to the pumper arm base 104a. The pumper arm base 104a may be connected to the frame 150.

One or more wheels may be connected to the steering mechanism. In this embodiment, a single front wheel 130 is preferably mounted to the steering mechanism (in this embodiment, a steering fork) 109, and the steering mechanism 109 is arranged in such a way that it can swivel right and left with the front wheel 130. The steering arm 106 is preferably connected to the steering mechanism 109 through a steering bar 106a. The steering arm 106 may be connected directly to the handle bar 103 or rower arms (not shown) and then connected to the steering bar 106a through the universal joint 105. When the handle bar 103 is turned, the steering arm 106 and steering bar 106a rotate in response and pivot the steering mechanism 109, connected to the front wheel 130, to turn the vehicle 100. Bearings 108 and bearing supports 108a may be provided to align the steering arm 106 and steering bar 106a within the pumper arm 104 and pumper arm base 104a, respectively. A battery powered motor 122 and associated battery 121 may be included to assist in providing a driving force to the vehicle 100. The motor 122 may be connected to the driving axle 200 through a belt, chain, or other connection mechanism. In one embodiment, the operator is given the option of selecting how much assistance to receive from the motor 122. The selection may range anywhere from no assistance to maximum assistance. A sensor may also be provided that detects when the operator is having difficulty powering the vehicle and activates the motor assist in response. In some embodiments, the pumping or rowing action can be used to recharge the battery or batteries for the electrical motor.

Figure 3:
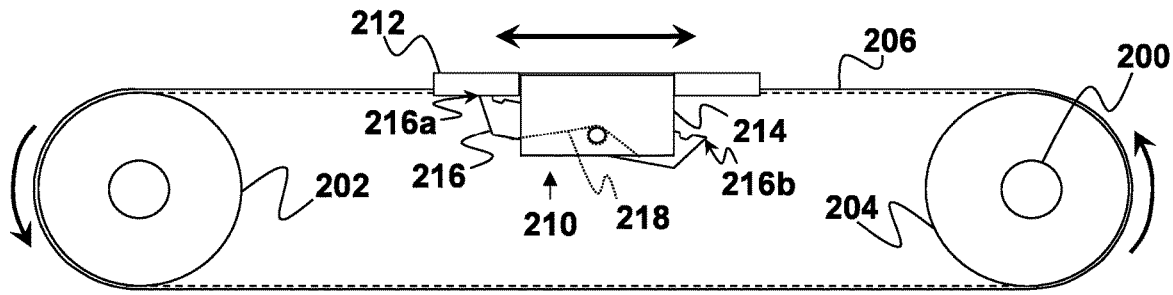
FIG. 3 is a somewhat schematic illustration of a belt drive assembly for the mobility vehicle of FIG. 1, according to one embodiment of the present inventive concepts.
Figure 3A:
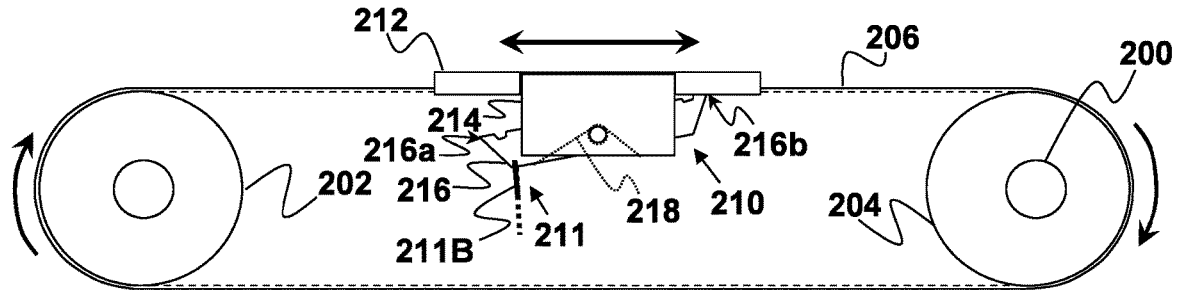
FIG. 3A is a somewhat schematic illustration of the belt drive assembly of FIG. 3, illustrating operation in a reverse direction.

Referring additionally to FIGS. 3 and 3A, an operation of the mobility vehicle 100, according to this embodiment, will now be described in more detail. As illustrated in FIGS. 3 and 3A, in this embodiment, the driving mechanism 210 may be provided to drive a driving belt 206 that travels in a loop around two wheels 202, 204. A first, free spinning wheel 202 may be arranged near the front of the vehicle 100. And a second drive wheel 204 may be fixidly attached to the driving axle 200 to force rotation of the driving axle 200 in the direction of the rotation of the drive wheel 204. Although this particular embodiment illustrates a belt 206 and wheels 202, 204, those could readily be replaced with a chain and sprockets.

A driving mechanism 210 may be arranged over the belt 206 and move forward and backward along with the foot slide 114 in response to motion of the pumper arm 104. The driving mechanism 210 may include a base 212, a bracket 214, and a driving catch 216 pivotably mounted in the bracket 214. The driving catch 216 may be biased by a spring 218 into a forward driving position (as shown in FIG. 3), or it may be activated into a forward driving position by a squeeze lever or other mechanism on the handle, or any other mechanical or electrically-assisted activation device (not shown).

Referring specifically to FIG. 3, in the forward driving position, a first engaging end 216a of the driving catch 216 engages with teeth in the belt 206. The first engaging end 216a of the catch 216 is designed such that it engages with the teeth of the belt 216 when moving in a first (forward) direction, but slides past the teeth without engagement when moving in a second, opposite direction. In this manner, as the driving mechanism 210 moves forward with the foot slide 114, the first engaging end 216a of the catch 216 engages with the teeth of the belt 206 to drive the belt forward. As it does so, the drive wheel 204 is driven forward, driving the axle 200 (along with the connected rear wheels 132) in a forward direction as well. Thus, the mobility vehicle 100 is driven forward in response to pumper arm assembly 102 movement.

Referring now to FIG. 3A, a reverse mechanism 211 can be provided that enables operation in a reverse direction by pivoting the driving member 216 against the force provided by the spring 218. This can be accomplished, for example, using a squeeze handle 211A (see FIG. 2) on the handle bar 103, or other lever or switch that may be connected to the driving mechanism 210 through cabling 211B, for example. When the reverse mechanism 211 is actuated, the driving member 216 is pivoted such that an opposite, second engaging end 216b of the driving member 216 engages the belt 206. The second engaging end 216b of the driving member 216 is configured to engage teeth of the belt 206 when moving in a rearward direction, but slide freely without engaging the belt teeth when moving in a forward direction. In this manner, with the reverse mechanism 211 engaged, the driving mechanism 210 engages and drives the belt 206 in a rearward direction, causing the rear drive wheel 204, axle 200, and rear wheels 132 to move in a reverse direction, thereby driving the vehicle 100 rearward, in response to movement of the pumper arm 104 and foot slide 114. The reverse mechanism 211 can also be configured to cause the motor 122 to drive the axle in the reverse direction.

Figure 4:
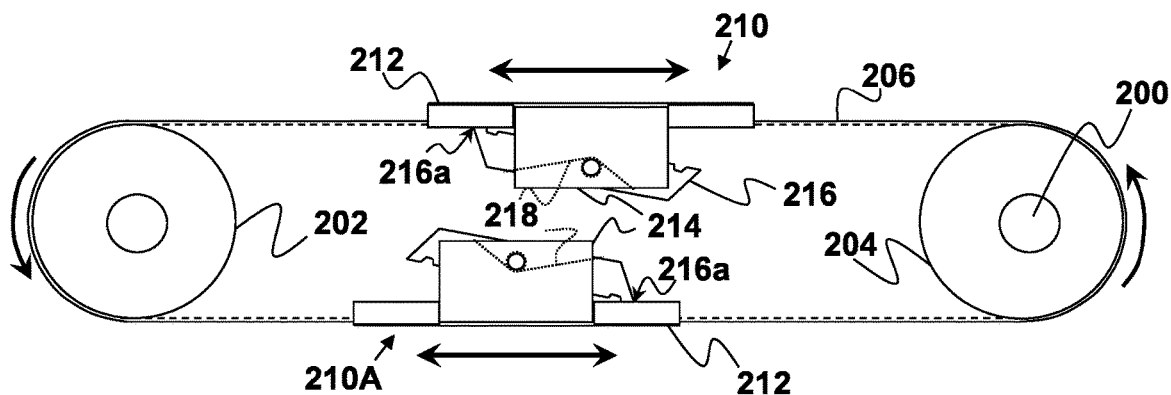
FIG. 4 is a somewhat schematic illustration of a belt drive assembly according to an alternative embodiment.

In an alternative embodiment shown in FIG. 4, two driving mechanisms 210, 210A can be provided. This embodiment may be useful, for example, when rowing arms are used rather than a pumper arm. Each of the driving mechanisms 210, 210A may operate in a manner similar to that described above.

Although not shown in the drawings, numerous other embodiments are possible without departing from the spirit and scope of the present inventive concepts. For example, in one embodiment, two sprockets may be provided on a driving assembly to selectively permit either forward or rearward movement of the vehicle based on pumper arm action. A first sprocket may be connected to a forward driving gear, and both the first sprocket and the driving gear may be rotatably and slidably mounted on the axle on one side of the drive wheel. A second sprocket may be connected to a rearward driving gear and both of these may be rotatably and slidably mounted on the axle on an opposite side of the drive wheel from the first sprocket. The first and second sprockets drive their respective gears only in one direction (either forward or reverse, respectively) while spinning freely in the opposite direction.

A chain and spring assembly may be provided for each of the sprockets. A first chain is arranged such that a first end of the first chain connects to the foot slide (or pumper arm). The first chain runs from the foot slide to a top of the first sprocket and then around the first sprocket. The second end of the first chain, coming from below the first sprocket, connects to one end of a first spring that is connected at its other end to the frame. As the pumper arm is actuated (pulled rearward), the foot slide moves forward, pulling the first chain along with it. As the first chain is pulled, it drives the first sprocket in a forward direction along with the connected forward driving gear and stretches the first spring. The first spring pulls the first chain back into its original position as the pumper arm moves forward again.

The second chain is arranged such that a first end of the second chain connects to one end of a spring that is connected at its other end to the frame. The chain extends from the spring to the top of the second sprocket and then around the sprocket. The second end of the second chain, coming from below the second sprocket, connects to the foot slide (or pumper arm). As the pumper arm is actuated, the second chain drives the second sprocket in a reverse direction along with its connected rearward driving gear. The second spring pulls the second chain back into its original position as the pumper arm moves forward again.

A chain retention system can be provided for one or both of the chains to reduce the length of spring needed to retract the chain to its original position. The chain retention system could include a pulley mounted on an end of a lever that is pivotably mounted to the frame. Rather than attach a spring to the end of the chain, a spring is attached to the lever such that the lever is biased in an extended position. The chain is connected to the frame at a first end near the chain retention system and extends around the pulley, to the sprocket and then around the sprocket to the foot slide connection point. As the pump arm retracts and the foot slide moves forward, the chain pulls down on the pulley and lever and stretches the spring. When the pump arm moves forward, the spring pulls back on the lever to raise it back into its extended position and return the chain to its starting position.

A drive wheel hub is rotatably mounted at a center location on the axle. A drive wheel gear is rotatably arranged on the hub, and the drive wheel is rigidly secured to the drive wheel gear to rotate along with the drive wheel gear. The drive wheel gear preferably includes teeth on both right and left side faces of the drive wheel gear.

The first and second sprockets may be connected to each other through the drive wheel hub using one or more pins or other mechanical connection that maintains them at a constant, predetermined distance from each other. The mechanical connection between the sprockets maintains the constant distance between the first and second sprockets (with their associated gears) as they slide back and forth along the axle. One or more springs arranged on the axle preferably bias the sprockets in a position where the forward driving gear connected to the first sprocket engages a first side of the drive wheel gear arranged on the same side of the drive wheel as the first sprocket. An inflatable rubber tire may be arranged on the drive wheel to engage with a travel surface. With the forward driving gear engaged, the drive wheel is driven in a forward rotation as the pumper arm is operated, causing the vehicle to move forward.

A squeeze bar is preferably provided on one side of the pumper arm handles. The squeeze bar may be connected to an actuator arm (or other shifting mechanism) through a cable system. The actuator bar is preferably connected to the sprocket assembly. When the squeeze bar is squeezed, the cable tightens and activates the actuator arm to move the sprocket assembly. More particularly, in response to a squeeze of the squeeze bar, the actuator arm slides the sprocket assembly against the spring bias into a reverse position. The actuator arm may, for instance, be a curved rod that communicates with the second sprocket. The squeeze bar may, for instance, be configured such that a squeeze of ¾ inch or less is sufficient to move the sprocket assembly between its forward and reverse positions.

In one aspect, the squeeze bar pulls a cable connected to a shifting mechanism. As the cable tightens, the shifting mechanism moves forward. The shifting mechanism is mounted on the axle near the second sprocket and has a narrow portion, a wide portion, and a curved slide surface between the narrow and wide portion. In the biased position, the narrow portion sits between the second sprocket and an axle mount. As the shifting mechanism moves forward, it slides such that the wider portion is slid into position between the axle mount and the second sprocket, pushing the sprocket assembly into the reverse position.

As the sprocket assembly slides to the reverse position, the forward driving gear disengages from the drive wheel gear, and the rearward driving gear connected to the second sprocket engages with the drive wheel gear on the side opposite the forward driving gear. In this position, as the pumper arm is operated, and the drive wheel is driven in a reverse direction, causing the vehicle to move backwards.

Of course, any other desired actuating mechanism such as a lever, button, dial, slide, or other device could be used to shift the sprockets from their forward-driving engagement to their rearward-driving engagement. Once the actuating (or shifting) mechanism is deactuated, the bias spring drives the first sprocket and forward driving gear back into engagement with the drive wheel gear and disengages the rearward driving gear so that operation of the pumper arm will drive the vehicle forward again. The teeth of the driving gears and drive wheel gear can be beveled or angled on their non-driving edges to permit self-alignment as the driving gears are moved into position.

A braking system can also be provided. The braking system could include a braking bar that pushes against the drive wheel when the brake is actuated. The brake could be actuated using a squeeze lever arranged on a handle opposite to the reverse-actuating mechanism. The squeeze lever could be connected to the braking bar through a cabling system. When the brake squeeze lever is squeezed, the cable tightens and pulls the braking lever up against the drive wheel. The braking system could be lockable to lock the brake in place and keep the vehicle from moving. The brake locking system could, for instance, be a toggle type system in the squeeze lever or a separate latch that folds over the squeeze lever and locks it in place. Of course, the braking system could be actuated in any other desirable manner and include any other desired type of braking system. For instance, a hand lever connected to the frame could be used to actuate and release the brake.

The drive wheel could include an inflatable tire mounted thereon with a tread pattern designed to engage a ground surface and provide sufficient traction to move the vehicle. The drive wheel may be arranged substantially directly underneath a seat of the vehicle (for instance, just rearward of a seat post) so that the operator's center of gravity is arranged substantially directly above the drive wheel.

The seat itself may be foldable, rotatable, lockable, and removable. More particularly, the seat back may fold down. The seat may swivel to permit easier operator entry and to facilitate positioning of the user next to a table. The seat may be lockable in a forward-facing position during operation of the vehicle and may be lockable in other desired positions as well. And the seat may be readily-removable by simply lifting it off of its seat post. The seat could also be lockably attached to the vehicle to prevent undesired removal.

In addition to the driving wheel and inflatable tire, two additional wheels and tires may be provided on opposite ends of the rear axle to provide stability. In one embodiment, these stabilizing wheels are preferably free-spinning wheels having a hard rubber tire. Furthermore, the stabilizing tires may contain little or no tread. The tires on the driving wheel and stabilizing wheels preferably have approximately the same diameter to keep the vehicle from rocking from side to side during operation.

To further improve transportability of the vehicle, the entire front end of the vehicle (including for instance, the forward pumping and steering assembly) could be foldable to collapse against the frame of the vehicle. In one such embodiment, the front end assembly could be mounted to the rest of the frame through a hinged joint. A spring biased latch could be provided to mate within a bracket on the frame to securely hold the front end assembly in its operating position. To collapse the front end, the latch could be released using a release mechanism. The release mechanism could, for example, be a lever, button, dial, slide, or any other desired release mechanism.

In another alternative embodiment, rower arms can be provided rather than a single pumper arm. In such an embodiment, two foot slides could be provided, each connected to an individual one of the rower arms. The foot slides in this embodiment move forward and rearward in opposition to the movement of the corresponding rower arm. In an embodiment having two handles, such as a rowing-style design, an extra sprocket could be provided on each side of the drive wheel. The extra sprockets facilitate the opposing forward and backward movement of the two handles.

In a still further embodiment, the driving mechanism may include a driving chain that travels in a loop around two sprockets. A first, free spinning sprocket is arranged near the front of the vehicle. A second, driving sprocket is fixidly attached to the driving axle, to force rotation of the driving axle in the direction of the rotation of the driving sprocket.

A forward driving catch may be arranged over the chain and move forward and backward along with the foot slide in response to motion of the pumper arm. The forward driving catch may be activated by a squeeze lever or other mechanism on the handle, or any other mechanical or electrically-assisted activation device. When activated, the forward driving catch closes over the chain and catches and pulls on the top segment of the chain as it moves forward with the foot slide. As the top of the chain is driven forward, the rearward driving sprocket is also driven forward along with the axle and attached wheels. Thus, the mobility vehicle is driven forward in response to pumper arm movement.

The forward driving catch preferably provides a ratchet-like action that catches and drives the chain forward during forward movement of the catch, but slides rearward freely without catching the chain. This can be accomplished, for instance, by providing engaging edges on the forward end of the catch that catch on the chain as the forward driving catch moves forward. The rearward end of the catch, however, can be open, or slanted away from the chain so that the forward driving catch slides freely rearward without engaging the chain.

A reverse mechanism can be provided in a similar manner. Specifically, a rearward driving catch can also be provided over a bottom segment of the chain and move forward and rearward along with the foot slide. The rearward driving catch may be activated by a squeeze handle or other activation device. When activated, the rearward driving catch closes over the chain and catches and pulls forward on the bottom of the chain as it moves forward with the foot slide as the pumper arm is pulled. As the bottom of the chain is pulled forward, the driving sprocket and driving axle are driven in reverse, causing rearward motion of the mobility vehicle. The reverse driving catch may have a ratchet-like construction similar to the forward driving catch such that it grabs and pulls the chain during forward movement, but slides freely along the chain during rearward movement.

In an alternative embodiment, the chain may be replaced by a belt or other driving system that circles around a free spinning front wheel or pulley and the rearward driving axle. The belt can be configured to provide the driving force to the axle, and the forward and rearward driving catches can be configured to pull the belt in a forward direction along the top or bottom of the belt, respectively, to drive the axle in the desired direction for forward or rearward movement of the vehicle.

In addition to the forward and rearward settings, a neutral setting may also be provided in which the foot slide and pumper arms do not engage the driving chain or belt. This setting may be provided to disable the pump-action power when a service provider desires to push or pull the vehicle without possible interference by the vehicle occupant, or when a vehicle occupant desires to coast.

Various other designs and embodiments are also contemplated and numerous variations to the specific designs identified above are possible without departing from the spirit and scope of the inventive concepts. For instance, the belt or chain could be a belt, chain, rope, cable, or any other structure or material that wraps around the pulleys or gears. The driving mechanism could have a gripper, actuator, or catch on one or both sides of belt, chain, rope, cable, or other material. If arranged on both sides, the mechanisms could be configured to catch on opposite sides and move in opposite directions. Having described and illustrated principles of the present inventive concepts on in various preferred embodiments thereof, it should be apparent that the invention can be modified in arrangement and detail without departing from such principles.

What is claimed is:

1. A pump-action mobility assistance and exercise device configured to provide both mobility and exercise to mobility-impaired users, said device comprising:

a ride-along frame having a seat mounted thereon for a user to sit on and one or more wheels mounted thereon to provide mobility;

at least one pumper arm connected to the frame within arm's reach of the user seated on the seat, said pumper arm configured to pivot rearward and forward around a pivot point to provide a pumping action in response to forward and rearward movement of the pumper arm by the user, wherein the pumper arm can be used to provide power to drive one or more of the one or more wheels;

a foot slide slidably mounted along the frame so as to be in communication with a user's feet when the user is seated on the seat, said foot slide connected to the pumper arm such that the foot slide moves forward and rearward in response to the pumping action or in response to forward and rearward movement of the user's feet, wherein the foot slide can independently provide power to drive one or more of the one or more wheels with or without a pumping action of the user's arms;

a steering arm connected through the pumper arm to a steering mechanism that is arranged to control a direction of travel of the device;

a belt or chain connected around a free spinning wheel and a drive wheel, wherein the drive wheel is fixed to a driving axle to drive movement of the driving axle in response to movement of the drive wheel, and wherein one or more of the one or more wheels are mounted on the driving axle;

a driving mechanism arranged on the belt or chain and configured to drive the belt or chain in a forward direction in response to movement of the pumper arm when the driving mechanism is in a forward driving configuration; and a reverse mechanism configured to move the driving mechanism from a forward driving configuration to a rearward driving configuration such that the driving mechanism is configured to drive the belt or chain in a rearward direction in response to movement of the pumper arm when the driving mechanism is in the rearward driving configuration.

2. The mobility and exercise device of claim 1, wherein the reverse mechanism comprises a reverse selector that can be activated by the user and cabling configured to move the driving mechanism from the forward to the rearward driving configuration.

3. The mobility and exercise device of claim 1, wherein the driving mechanism comprises a driving catch that is configured to pivot between a forward driving position and a rearward driving position to switch the driving mechanism between the forward driving configuration and the rearward driving configuration.

4. The mobility and exercise device of claim 3, wherein the driving catch engages the belt or chain in a forward direction but slides freely along the belt or chain in a rearward direction when the driving catch is in the forward driving position.

5. The mobility and exercise device of claim 3, wherein the driving catch engages the belt or chain in a rearward direction but slides freely along the belt or chain in a forward direction when the driving catch is in the rearward driving position.

6. The mobility and exercise device of claim 3, wherein the belt comprises teeth configured to engage with the driving catch.

7. The mobility and exercise device of claim 1, wherein the foot slide is connected to the pumper arm through transfer arms and adjustable transfer linkages.

8. The mobility and exercise device of claim 1, further comprising a motor configured to provide a power assist to help drive the device.

9. The mobility and exercise device of claim 8, further comprising a selector switch that enables an operator to select how much assistance to receive from the motor.

10. The mobility and exercise device of claim 8, wherein the pump-action can be used to recharge an electrical power source for the motor.

11. A pump-action mobility and exercise vehicle comprising:
- a frame;
- a seat mounted on the frame for a user to sit on;
- two or more wheels mounted on opposite sides of an axle connected to the frame to provide mobility and stability for the user, such that the user may sit on the vehicle with their legs elevated and supported without the risk of tipping over;
- a pump-action arm configured to provide exercise for the user and movement to the vehicle when pumped;
- a foot slide connected to an end of the pump-action arm, wherein the foot slide comprises a substantially flat supporting surface configured to support the user's feet in a substantially horizontal position and wherein the foot slide slides forward and rearward along the vehicle frame in response to the pump-action to provide additional exercise to the user, said foot slide further configured to provide movement to the vehicle when pushed forward and rearward by the user's feet;
- a chain or belt assembly that engages a drive wheel on the axle to provide rotational movement to the axle; and
- a drive mechanism configured to selectively engage the chain or belt assembly to drive the chain or belt assembly in a forward direction.

12. The pump-action mobility and exercise vehicle according to claim 11, further comprising a reverse mechanism configured to cause the drive mechanism to selectively engage the chain or belt assembly to drive the chain or belt assembly in an opposite direction.

13. The pump-action mobility and exercise vehicle according to claim 12, wherein the drive mechanism comprises a catch rotatably mounted to a base such that in a first position the drive mechanism drives the chain or belt assembly in a forward direction and in a second position the drive mechanism drives the chain or belt in a reverse direction.

14. The pump-action mobility and exercise vehicle according to claim 13, further comprising a selector connected to the drive mechanism to selectively pivot the catch from the first position to the second position.

15. The pump-action mobility and exercise vehicle according to claim 11, further comprising a steering arm arranged within the pump-action arm and configured to steer the vehicle.

16. The pump-action mobility and exercise vehicle according to claim 15, wherein the steering arm connects to a steering bar through a universal joint arranged at a pivot point of the pump-action arm, and wherein the steering bar connects to a steering mechanism that pivots a front wheel.

17. A pump-action mobility and exercise device comprising:
- a frame;
- a pump arm connected to the frame and having a pivot point, said pump arm configured to power the device movement and provide exercise to a user;
- a steering arm connected to the pump arm through a universal joint, wherein the universal joint is aligned with a center of the pivot point; and
- a steering bar connected to a steering mechanism that turns one or more front wheels of the device from side to side in response to turning of the pump arm;
- a foot slide connected to the pump arm and configured to slide forward and backward in response to a pumping action of the pump arm or in response to forward and rearward movement of the user's feet; and
- a drive mechanism that drives the device in a selected forward or reverse direction in response to the pumping action of the pump arm or forward and rearward movement of the foot slide.

18. The pump-action mobility and exercise device of claim 17, wherein the drive mechanism comprises a catch that selectively engages a chain or belt in a first direction to drive an axle of the device.

19. The pump-action mobility and exercise device of claim 18, wherein the drive mechanism further comprises a reverse mechanism configured to drive the axle in a reverse direction.

20. The pump-action mobility and exercise device of claim 19, wherein the reverse mechanism pivots the catch such that the catch selectively engages the chain or belt in an opposite direction to the first direction.

* * * * *